(12) United States Patent
Zhang et al.

(10) Patent No.: US 8,965,747 B2
(45) Date of Patent: Feb. 24, 2015

(54) AUTOMATIC THREE-PHASE UNBALANCED LOAD COMPENSATION EXPERIMENTAL DEVICE AND ITS CONTROL METHOD

(75) Inventors: Huaguang Zhang, Shenyang (CN); Qiuye Sun, Shenyang (CN); Zhenwei Liu, Shenyang (CN); Tieyan Zhang, Shenyang (CN); Xiangping Meng, Changchun (CN); Qingqi Zhao, Shenyang (CN); Jianguo Zhou, Shenyang (CN); Jun Yang, Shenyang (CN); Dazhong Ma, Shenyang (CN); Yan Zhao, Shenyang (CN); Xinrui Liu, Shenyang (CN); Jing Guo, Shenyang (CN)

(73) Assignees: Northeastern University, Liaoning Province (CN); Huaguang Zhang, Liaoning Province (CN); Qiuye Sun, Liaoning Province (CN); Zhenwei Liu, Liaoning Province (CN); Tieyan Zhang, Liaoning Province (CN); Xiangping Meng, Liaoning Province (CN); Qingqi Zhao, Liaoning Province (CN); Jianguo Zhou, Liaoning Province (CN); Jun Yang, Liaoning Province (CN); Dazhong Ma, Liaoning Province (CN); Yan Zhao, Liaoning Province (CN); Xinrui Liu, Liaoning Province (CN); Jing Guo, Liaoning Province (CN)

( * ) Notice: Subject to any disclaimer, the term of this patent is extended or adjusted under 35 U.S.C. 154(b) by 346 days.

(21) Appl. No.: 13/483,997

(22) Filed: May 30, 2012

(65) Prior Publication Data
US 2013/0054204 A1 Feb. 28, 2013

(30) Foreign Application Priority Data
Aug. 26, 2011 (CN) .......................... 2011 1 0249895

(51) Int. Cl.
*G06F 17/50* (2006.01)
*H02J 3/26* (2006.01)
(Continued)

(52) U.S. Cl.
CPC .... *H02J 3/26* (2013.01); *H02J 3/14* (2013.01); *H02J 2003/007* (2013.01); *Y04S 40/22* (2013.01); *Y02E 60/76* (2013.01)
USPC ................................................ 703/13; 703/18

(58) Field of Classification Search
CPC ... G05F 1/70; G06B 19/0069; G06F 2217/78; H02J 2001/106; H02J 1/14; H02J 2003/003; H02J 3/14; G09B 23/188
USPC ........ 703/13, 14, 18; 323/211, 212, 209, 205, 323/210; 702/58
See application file for complete search history.

(56) References Cited

U.S. PATENT DOCUMENTS
2006/0022648 A1* 2/2006 Ben-Yaakov et al. ......... 323/222
(Continued)

OTHER PUBLICATIONS
M.W. Davis, R. Broadwater, J. Hambrick, Modeling and Testing of Unbalanced Load and Voltage Regulation, National Renewable Energy Laboratory, NREL/SR-581-41805, Jul. 2007.*
(Continued)

*Primary Examiner* — Kamini S Shah
*Assistant Examiner* — Scott S Cook
(74) *Attorney, Agent, or Firm* — Muncy, Geissler, Olds & Lowe, P.C.

(57) ABSTRACT

An automatic three-phase unbalanced load compensation experimental device includes an automatic compensation device, a load simulation part, and detection, display and control parts. The automatic compensation device includes power capacitors and intelligent grouping compound switches. The detection, display and control part includes a plurality of current transformers, molded case circuit breakers, a three-phase digital display ammeter, a three-phase electric power monitoring instrument, a protocol conversion module, RS-485 buses, Ethernet cables and an upper computer. The load simulation part includes phase A, B and C loads which are in star connection and are same in component and circuit connection, an analog output module and a relay output module. A power monitoring instrument and digital ammeter are connected to the grid by circuit breaker and the plurality of current transformers. The automatic compensation device and load simulation part are connected to the grid in parallel.

5 Claims, 7 Drawing Sheets

(51) Int. Cl.
   *H02J 3/14*   (2006.01)
   *H02J 3/00*   (2006.01)

(56) References Cited

U.S. PATENT DOCUMENTS

2007/0164779 A1* 7/2007 Weston et al. ................. 326/26
2008/0094188 A1* 4/2008 Swarztrauber et al. .. 340/310.17
2014/0309952 A1* 10/2014 Sun ................................ 702/58

OTHER PUBLICATIONS

M. Kesler, E. Ozdemir, Operation of Shunt Active Power Filter under Unbalanced Load and Distorted Load Conditions, IEEE International Electric Machines and Drives Conference, IEMDC 2007, Antalya, Turkey, 608-613 (2007).*
Joshi et al. Microprocessor Based Automatic Power Factor Control, IEEE TENCON 1993, Beijing.*
Salmerón, P., Vázquez, J. R., Herrera, R. S., & Litrán, S. P. Apparent power and power factor in unbalanced and distorted systems. Applications in three phase load compensations, International Conference on Renewable Energies and Power Quality, Mar. 2007.*
TERCO Product Manual, PST 2200 Power System Simulator Laboratory, 2010.*
Karki, R., Design Lab II: An Automatic Power Factor Correction System, 2009 downloaded from the internet www.engr.usask.ca/classes/EE/391/open/PFC.pdf.*

* cited by examiner

AUTOMATIC THREE-PHASE UNBALANCED LOAD COMPENSATION EXPERIMENTAL DEVICE AND ITS CONTROL METHOD

BACKGROUND OF THE INVENTION

1. Field of the Invention

The present invention relates to a technical field of an electrical power transmission and distribution, in particular to an automatic three-phase unbalanced load compensation experimental device and its control method.

2. The Prior Arts

Three-phase load unbalance has many adverse effects on power system. At present, people have done much research on three-phase unbalanced load compensation of the electrical power transmission and distribution system, focusing on the design of the reactive power compensation device body and the control strategies and methods of the reactive power compensation device. Due to lots of restrictive conditions, many advanced algorithms and control strategies are still deduced theoretically and simulated by the computer, and a few can be tested in site with much preparation and high cost. Therefore, a general, automatic three-phase unbalanced load compensation experimental platform is applicable to the test of various unbalanced load compensation strategies, and this experimental platform only can perform its function when there is a loading device. Reactive power compensation mainly aims at loads such as electric arc furnace, electric welding machine, electrified railway, etc. in industry. These loads can cause reactive power impact on the system in a short time, which causes serious three-phase unbalance of the system. When this type of load is simulated on the experimental platform, load variation must be controlled quickly and accurately. At the same time, lots of single-phase electrical equipment in the power system have strong randomness and uncertainty, so a load simulation experimental device which can connect/disconnect inductive load, capacitive load and resistive load in various topologies into/from the system quickly and accurately have great practical significance.

SUMMARY OF THE INVENTION

Aiming at the disadvantages of the prior art, the present invention provides an automatic three-phase unbalanced load compensation experimental device and its control method to simulate various actual industrial and civil loads in the laboratory and assess the compensation effect of the automatic compensation device. The experimental device and its control method of the present invention have strong simulation genuineness and low cost and are easy to achieve.

The purpose of the present invention is achieved by the following technical schemes: the automatic three-phase unbalanced load compensation experimental device of the present invention comprises an automatic compensation device, a load simulation part and a detection, display and control part. The automatic compensation device comprises a power capacitor and an intelligent grouping load switch; the load simulation part comprises A-phase load, B-phase load and C-phase load which have the same components, a switch power supply, an analog output module and a relay output module; the A-phase load, the B-phase load and the C-phase load each comprise a single-phase nonlinear reactor with fixed impedance, a magnetic control reactor with adjustable single-phase impedance, a single-phase capacitor, a single-phase resistor, a single-phase AC contactor, an anti-parallel thyristor and an intermediate relay; A-phase, B-phase and C-phase simulated loads are connected to the electrical network through a molded case circuit breaker; the detection, display and control part comprises a plurality of current transformers, a plurality of molded case circuit breakers, a three-phase digital display ammeter, a three-phase electric power monitoring instrument, a protocol conversion module (485 serial to Ethernet module), 485 buses (i.e., RS-485 buses). Ethernet cables and an upper computer. The upper computer controls the connection and disconnection of each simulated load of the load simulation part by operating the load simulation algorithm to assess the compensation effect of the automatic compensation device.

Circuit Connection:

The load simulation part is connected with the electrical network; the automatic compensation device is connected with the electrical network, connected with the load simulation part in parallel and located in front of the load simulation part; the three-phase digital display ammeter of the detection, display and control part is connected with the current transformer of the electrical network on the load simulation side; the three-phase electric power monitoring instrument of the detection, display and control part is connected with the access point electrical network of the automatic compensation device.

The automatic compensation device comprises a power capacitor and an intelligent grouping load switch; both ends of the power capacitor are respectively connected with the intelligent grouping load switch which is connected with the electrical network.

The load simulation part comprises A-phase load, B-phase load and C-phase load which have the same components, a switch power supply, an analog output module and a relay output module; the A-phase load, the B-phase load and the C-phase load each comprise a single-phase nonlinear reactor with fixed impedance, a magnetic control reactor with adjustable single-phase impedance, a single-phase capacitor, a single-phase resistor, a single-phase AC contactor, an anti-parallel thyristor and an intermediate relay; A-phase, B-phase and C-phase simulated loads are in star connection in accordance with the three phase four wire system and each consist of four branches connected in parallel. For the C-phase load, one end of the magnetic control reactor with adjustable single-phase impedance is connected with the single-phase AC contactor, the other end of the single-phase AC contactor is connected with one end of the anti-parallel thyristor, and the other end of the anti-parallel thyristor is connected with one end of the contact of the intermediate relay; one end of the single-phase nonlinear reactor with fixed impedance is connected to one end of the single-phase AC contactor, and the other end of the single-phase AC contactor is connected with one end of the contact of the intermediate relay; one end of the single-phase capacitor is connected to one end of the single-phase AC contactor, and the other end of the single-phase AC contactor is connected with one end of the contact of the intermediate relay; one end of the single-phase resistor is connected to one end of the single-phase AC contactor, and the other end of the single-phase AC contactor is connected with one end of the contact of the intermediate relay; the other end of the magnetic control reactor with adjustable single-phase impedance is connected with the other end of the single-phase nonlinear reactor with fixed impedance, and the other end of the single-phase capacitor is connected with the other end of the single-phase resistor; the other ends of the contacts of the intermediate relays are connected together and are connected with the neutral line; the A-phase load and the B-phase load have the same circuit connection with the C-phase load, and the A-phase load, the B-phase load and the C-phase load are in star connection and then are connected to the electrical network through the molded case circuit breaker.

The detection, display and control part comprises a current transformer, a molded case circuit breaker, a three-phase digital display ammeter, a three-phase electric power monitoring instrument, a protocol conversion module (485 serial to Ethernet module), 485 buses, Ethernet cables and an upper computer. The upper computer is communicated through Ethernet and is connected to the Ethernet interface of the protocol conversion module (485 serial to Ethernet module) by the Ethernet cable, the protocol conversion module (485 serial to Ethernet module) is respectively connected to the three-phase electric power monitoring instrument, the three-phase digital display ammeter, and the 485 communication terminal blocks of the analog output module and the relay output module of the load simulation part through 485 buses. The input end of the three-phase electric power monitoring instrument is connected with the output ends of the molded case circuit breaker and the current transformer, and the input ends of the molded case circuit breaker and the current transformer are connected to the electrical network; the input end of the three-phase digital display ammeter is connected with the output end of the current transformer, and the input end of the current transformer is connected with the electrical network; the output end of the analog output module of the load simulation part is connected to the control ends of the anti-parallel thyristors of the A-phase load, the B-phase load and the C-phase load, and the relay output module of the load simulation part is connected to the coil of the intermediate relay of each branch of the A-phase load, the B-phase load and the C-phase load; the input end of the switch power supply of the load simulation part is connected to the electrical network by a micro circuit breaker, and the output end is connected to the supply terminals of the analog output module and the relay output module.

The control part of the present invention mainly controls the connection and disconnection of simulated load and detects electrical quantity for parameter calculation.

The load simulation and effect control detection method of the present invention comprises the following steps:

Step 1: Begin;

Step 2: Check that communications are normal. If yes, go to Step 3; otherwise, continue waiting;

Step 3: Acquire three-phase voltage and three-phase line current of the compensation access point and the load side in real time by the three-phase electric power monitoring instrument and the three-phase digital display ammeter;

Step 4: Transmit the parameters of the three-phase voltage and the three-phase line current to the upper computer through a 485 serial to Ethernet module;

Step 5: Execute the Parameter Calculation Sub-process in the upper computer, wherein, parameter calculation refer to using the instantaneous values of the measured three-phase voltage and three-phase line current to calculate the effective value of the three-phase voltage, the active power, the reactive power, the apparent power and the power factor of each load, the total active power, the total reactive power, the total apparent power, the total power factor, the three-phase voltage unbalance factor and the harmonic distortion factor;

Step 6: Store the data into the database, wherein, the data includes parameters calculated in Step 5 and the instantaneous values of voltage and current of each load in a period of time for harmonic analysis and efficiency assessment;

Step 7: Use the upper computer to select the actual load type to be simulated;

Step 8: Execute the Load Simulation Control Process in accordance with the result in Step 7 to operate the load simulation algorithm;

Step 9: Judge if there is new simulated load selection input in the upper computer. If any, skip to Step 8; otherwise, go to Step 10;

Step 10: End.

In the Parameter Calculation Sub-process in Step 5, use the instantaneous reactive power theory to calculate the active power, the reactive power, the apparent power and the power factor of each load, and the total active power, the total reactive power, the total apparent power and the total power factor of three loads.

The instantaneous reactive power theory is based on the instantaneous value and is applicable to sine steady state and non-sine transient state. The traditional power theory is based on the average value and is only applicable to sine steady state. The device of the present invention uses the instantaneous reactive power theory and calculates the above parameters in accordance with three-phase instantaneous voltage and current.

Set $u_a$, $u_b$, $u_c$, $i_a$, $i_b$ and $i_c$ respectively as the acquired three-phase voltage and three-phase line current, and obtain $u_\alpha$, $u_\beta$, $i_\alpha$ and $i_\beta$ through conversion of A, B and C phases to $\alpha$-$\beta$ two phases.

$$\begin{bmatrix} u_\alpha \\ u_\beta \end{bmatrix} = C_{\alpha\beta} \begin{bmatrix} u_a \\ u_b \\ u_c \end{bmatrix}, \begin{bmatrix} i_\alpha \\ i_\beta \end{bmatrix} = C_{\alpha\beta} \begin{bmatrix} i_a \\ i_b \\ i_c \end{bmatrix} \quad (1)$$

Wherein $$C_{\alpha\beta} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix}.$$

Synthesize vectors $\vec{u}_\alpha$, $\vec{u}_\beta$, and $\vec{i}_\alpha$, $\vec{i}_\beta$ on the $\alpha$-$\beta$ plane respectively as (rotating) voltage vector $\vec{u}$ and current vector $\vec{i}$.

$$\vec{u} = \vec{u}_\alpha + \vec{u}_\beta = u\angle\phi_u, \vec{i} = \vec{i}_\alpha + \vec{i}_\beta = i\angle\phi_i \quad (2)$$

Wherein, u and i are respectively the module of vectors $\vec{u}$ and $\vec{i}$; $\phi_u$ and $\phi_i$ are respectively the phase angle of vectors $\vec{u}$ and $\vec{i}$.

Project the current vector $\vec{i}$ on the voltage vector $\vec{u}$ and its normal line, and obtain $i_p$ and $i_q$ which are respectively the instantaneous active current and the instantaneous reactive current of the three-phase circuit.

$$i_p = i\cos\phi, i_q = i\sin\phi \quad (3)$$

Wherein, $\phi = \phi_u - \phi_i$.

The product of u and $i_p$ is the instantaneous active power of the three-phase circuit, and the product of the u and $i_q$ is the instantaneous reactive power of the three-phase circuit.

$$p = ui_p, q = ui_q \quad (4)$$

Substitute Formula (3) in Formula (4) to obtain:

$$\begin{bmatrix} p \\ q \end{bmatrix} = \begin{bmatrix} u_\alpha & u_\beta \\ u_\beta & -u_\alpha \end{bmatrix} \begin{bmatrix} i_\alpha \\ i_\beta \end{bmatrix} = C_{pq} \begin{bmatrix} i_\alpha \\ i_\beta \end{bmatrix} \quad (5)$$

Wherein, $$C_{pq} = \begin{bmatrix} u_\alpha & u_\beta \\ u_\beta & -u_\alpha \end{bmatrix}.$$

Substitute Formula (1) in Formula (5) to obtain:

$$p = u_a i_a + u_b i_b + u_c i_c,$$

$$q = \frac{1}{\sqrt{3}}[(u_b - u_c)i_a + (u_c - u_a)i_b + (u_a - u_b)i_c] \quad (6)$$

The projections of the three-phase instantaneous power current on α axis and β axis are respectively the instantaneous power current of α phase and β phase:

$$i_{\alpha p} = i_p \cos\varphi_u \quad (7)$$
$$= \frac{u_\alpha}{u} i_p$$
$$= \frac{u_\alpha}{u_\alpha^2 + u_\beta^2} p,$$

$$i_{\alpha p} = i_p \cos\varphi_u$$
$$= \frac{u_\alpha}{u} i_p$$
$$= \frac{u_\alpha}{u_\alpha^2 + u_\beta^2} p,$$

$$i_{\alpha q} = i_q \sin\varphi_u$$
$$= \frac{u_\beta}{u} i_q$$
$$= \frac{u_\beta}{u_\alpha^2 + u_\beta^2} q,$$

$$i_{\beta q} = i_q \cos\varphi_u$$
$$= \frac{u_\alpha}{u} i_q$$
$$= \frac{u_\alpha}{u_\alpha^2 + u_\beta^2} q$$

Wherein, $i_{\alpha p}$ and $i_{\beta p}$ are respectively the instantaneous active current of α phase and β phase; $i_{\alpha q}$ and $i_{\beta q}$ are respectively the instantaneous reactive current of α phase and β phase.

The instantaneous power of α phase and β phase is respectively the product of instantaneous voltage and the instantaneous current of the related phase.

$$p_\alpha = u_\alpha i_{\alpha p} = \frac{u_\alpha^2}{u_\alpha^2 + u_\beta^2} p, \quad (8)$$

$$p_\beta = u_\beta i_{\beta p} = \frac{u_\beta^2}{u_\alpha^2 + u_\beta^2} p,$$

-continued $$q_\alpha = u_\alpha i_{\alpha q} = \frac{u_\alpha^2 u_\beta}{u_\alpha^2 + u_\beta^2} q,$$

$$q_\beta = u_\beta i_{\beta q} = -\frac{u_\alpha^2 u_\beta}{u_\alpha^2 + u_\beta^2} q$$

The power current of each phase of the three-phase circuit can be obtained by using the two-phase power current through conversion of α phase and β phase to A phase, B phase and C phase.

$$\begin{bmatrix} i_{ap} \\ i_{bp} \\ i_{cp} \end{bmatrix} = C_{23} \begin{bmatrix} i_{\alpha p} \\ i_{\beta p} \end{bmatrix}, \quad (9)$$

$$\begin{bmatrix} i_{aq} \\ i_{bq} \\ i_{cq} \end{bmatrix} = C_{23} \begin{bmatrix} i_{\alpha q} \\ i_{\beta q} \end{bmatrix},$$

Wherein, $C_{23} = C_{\alpha\beta}^T$

Substitute Formula (7) in Formula (9) to obtain:

$$i_{ap} = 3u_a \frac{p}{A}, \quad (10)$$

$$i_{bp} = 3u_b \frac{p}{A},$$

$$i_{cp} = 3u_c \frac{p}{A},$$

$$i_{aq} = (u_b - u_c)\frac{q}{A},$$

$$i_{bq} = (u_c - u_a)\frac{q}{A},$$

$$i_{cq} = (u_a - u_b)\frac{q}{A}$$

Wherein, $A = (u_a - u_b)^2 + (u_b - u_c)^2 + (u_c - u_a)^2$

The instantaneous active power and the instantaneous reactive power of the A-phase load, the B-phase load and the C-phase load are:

$$p_a = u_a i_{ap} = 3u_a^2 \frac{p}{A}, \quad (11)$$

$$p_b = u_b i_{bp} = 3u_b^2 \frac{p}{A},$$

$$p_c = u_c i_{cp} = 3u_c^2 \frac{p}{A}$$

$$q_a = u_a i_{aq} = u_a(u_b - u_c)\frac{q}{A}, \quad (12)$$

$$q_b = u_b i_{bq} = u_b(u_c - u_a)\frac{q}{A},$$

$$q_c = u_c i_{cq} = u_c(u_a - u_b)\frac{q}{A}$$

The unbalance factor of the three-phase electric parameter is defined as the percentage of negative sequence component and positive sequence component of the three-phase phasor, and is represented by ϵ as:

$$\varepsilon = \frac{A_2}{A_1} \times 100\% \tag{13}$$

Wherein, $A_1$, and $A_2$ are respectively the root-mean-square value of the positive sequence component and the negative sequence component.

Any group of three-phase asymmetrical phasors (such as voltage, current, etc.) can be resolved into three groups of symmetrical phasors: positive sequence component, negative sequence component and zero sequence component:

$$\begin{bmatrix} \dot{A}_1 \\ \dot{A}_2 \\ \dot{A}_0 \end{bmatrix} = \frac{1}{3} \begin{bmatrix} 1 & \alpha & \alpha^2 \\ 1 & \alpha^2 & \alpha \\ 1 & 1 & 1 \end{bmatrix} \begin{bmatrix} \dot{A} \\ \dot{B} \\ \dot{C} \end{bmatrix} \tag{14}$$

A simple method is that using the modules A and C of $\dot{A}$ and $\dot{C}$ and their included angle $\beta$ can calculate the effective values of the positive sequence component and the negative sequence component as the following formula:

$$\begin{cases} A_1^2 = \frac{1}{3}[A^2 + C^2 - 2AC\cos(240° - \beta)] \\ A_2^2 = \frac{1}{3}[A^2 + C^2 - 2AC\cos(\beta - 120°)] \end{cases} \tag{15}$$

In the device of the present invention, the fundamental voltage amplitude values $U_{A1}$ and $U_{C1}$ and the phase angles $\phi_{A1}$ and $\phi_{C1}$ of the A-phase load and the C-phase load can be obtained from the process of harmonic analysis, and the expression of the unbalance factor of the three-phase fundamental voltage can be obtained from Formulae (13) and (14) to calculate the unbalance factor of the three-phase fundamental voltage:

$$\varepsilon = \sqrt{\frac{U_{A1}^2 + U_{C1}^2 - U_{A1}U_{C1}\cos(|\varphi_{A1} - \varphi_{C1}| - 120°)}{U_{A1}^2 + U_{C1}^2 - 2U_{A1}U_{C1}\cos(240° - |\varphi_{A1} - \varphi_{C1}|)}} \times 100\% \tag{16}$$

To sum up, the parameter calculation sub-process comprises the following steps:
Step 1: Begin;
Step 2: Acquire the instantaneous values of the three-phase voltage and the three-phase line current to calculate the effective value of the voltage;
Step 3: Calculate the total instantaneous active power p, the total instantaneous reactive power q, the total instantaneous apparent power s and the total instantaneous power factor cos θ of the three loads:

$$p = u_a i_a + u_b i_b + u_c i_c \tag{17}$$

$$q = \frac{1}{\sqrt{3}}[(u_b - u_c)i_a + (u_c - u_a)i_b + (u_a - u_b)i_c] \tag{18}$$

$$s = \sqrt{p^2 + q^2} \tag{19}$$

$$\cos\theta = \frac{p}{s} \tag{20}$$

Step 4: Calculate the instantaneous active power $p_a$, $p_b$ and $p_c$, the instantaneous reactive power $q_a$, $q_b$ and $q_c$, the instantaneous apparent power $s_a$, $s_b$ and $s_c$, and the instantaneous power factors cos $\theta_a$, cos $\theta_b$ and cos $\theta_c$ of each of the A-phase load, the B-phase load and the C-phase load;

A-phase load:

$$p_a = u_a i_{ap} = 3u_a^2 \frac{p}{A} \tag{21}$$

$$q_a = u_a i_{aq} = u_a(u_b - u_c)\frac{q}{A} \tag{22}$$

$$s_a = \sqrt{p_a^2 + q_a^2} \tag{23}$$

$$\cos\theta_a = \frac{p_a}{s_a} \tag{24}$$

B-phase load:

$$p_b = u_b i_{bp} = 3u_b^2 \frac{p}{A} \tag{25}$$

$$q_b = u_b i_{bq} = u_b(u_c - u_a)\frac{q}{A} \tag{26}$$

$$s_b = \sqrt{p_b^2 + q_b^2} \tag{27}$$

$$\cos\theta_b = \frac{p_b}{s_b} \tag{28}$$

C-phase load:

$$p_c = u_c i_{cp} = 3u_c^2 \frac{p}{A} \tag{29}$$

$$q_c = u_c i_{cq} = u_c(u_a - u_b)\frac{q}{A} \tag{30}$$

$$s_c = \sqrt{p_c^2 + q_c^2} \tag{31}$$

$$\cos\theta_c = \frac{p_c}{s_c} \tag{32}$$

Wherein, $A = (u_a - u_b)^2 + (u_b - u_c)^2 + (u_c - u_a)^2$

Step 5: Calculate the amplitude value $U_m$ and the phase $\phi_m$ of each harmonic voltage, the voltage harmonic content $HRU_m$ and the voltage harmonic distortion factor $THD_U$;

$$U_m = \sqrt{a_m^2 + b_m^2} \tag{33}$$

$$\varphi_m = \arctan\frac{b_m}{a_m} \tag{34}$$

$$HRU_m = \frac{U_m}{U_1} \times 100\% \tag{35}$$

$$THD_U = \frac{\sqrt{\sum_{m=2}^{M} U_m^2}}{U_1} \times 100\% \tag{36}$$

Step 6: Calculate the three-phase voltage unbalance factor ε;

$$\varepsilon = \sqrt{\frac{U_{A1}^2 + U_{C1}^2 - 2U_{A1}U_{C1} \cos(|\varphi_{A1} - \varphi_{C1}| - 120°)}{U_{A1}^2 + U_{C1}^2 - 2U_{A1}U_{C1} \cos(240° - |\varphi_{A1} - \varphi_{C1}|)}} \times 100\% \quad (37)$$

Step 7: End the parameter calculation sub-process.

The load simulation control process of the present invention mainly simulates load and measures the response time and the compensation effect of the automatic compensation device of the experimental platform. The load simulation control process of the present invention comprises the following steps:

Step 1: Begin;
Step 2: Check that the experimental platform is used for compensation. If yes, go to Step 3; otherwise, continue waiting;
Step 3: Execute the Load Simulation Sub-process, apply the corresponding load and record the time of this moment t0;
Step 4: Acquire three-phase voltage and three-phase line current of the compensation access point and the load side in real time by the three-phase electric power monitoring instrument and the three-phase digital display ammeter and transmit them to the upper computer;
Step 5: Execute the Parameter Calculation Sub-process and store the obtained parameters in the database;
Step 6: Judge if there is new simulated load selection input in the upper computer. If any, skip to Step 3; otherwise, go to Step 7;
Step 7: Judge if the three-phase voltage and the three-phase line current are in steady state. If yes, go to Step 8; otherwise, skip to Step 4;
Step 8: Calculate the voltage unbalance factor at steady state and record the time of this moment t1;
Step 9: Store the data in the database, including the reactive power compensation adjustment time and the voltage unbalance factor;
Step 10: End.

The load simulation sub-process of the present invention has the function of sending commands through the upper computer to control the relay and the anti-parallel thyristor to connect and disconnected the simulated load, and comprises the following steps:

Step 1: Begin;
Step 2: The upper computer sends messages to the protocol conversion module in accordance with the selected simulated load type;
Step 3: The protocol conversion module (485 serial to Ethernet module) sends control commands to the analog output module and the relay output module through the 485 bus;
Step 4: The relay output module sends the action command to the related relay, and the analog output module sends the trigger angle dephasing command to the related anti-parallel thyristor to make the relay and the anti-parallel thyristor act to apply the corresponding simulated load;
Step 5: End.

The present invention has the advantages that the load simulation device is simple in structure, easy to achieve and easy to control through programming and has strong simulation genuineness, and the load simulation device can simulate actual load for industrial production including electric welding equipment, rolling mill, riser, winch, crane, electric arc furnace, large-scale convertor equipment, frequency control device, electric locomotive on electrified railway, etc.

DETAILED DESCRIPTION OF THE PREFERRED EMBODIMENT

The detailed structure, the operating principle and the control method of the automatic three-phase unbalanced load compensation experimental device of the present invention are described by figures and the embodiment as follows:

In the embodiment, the 220 V automatic three-phase unbalanced load compensation experimental platform used in the laboratory is taken as an example. The automatic compensation device consists of an intelligent grouping load switch and a power capacitor and can balance the three-phase unbalanced load with active power and compensate this load with reactive power.

Figure 1:
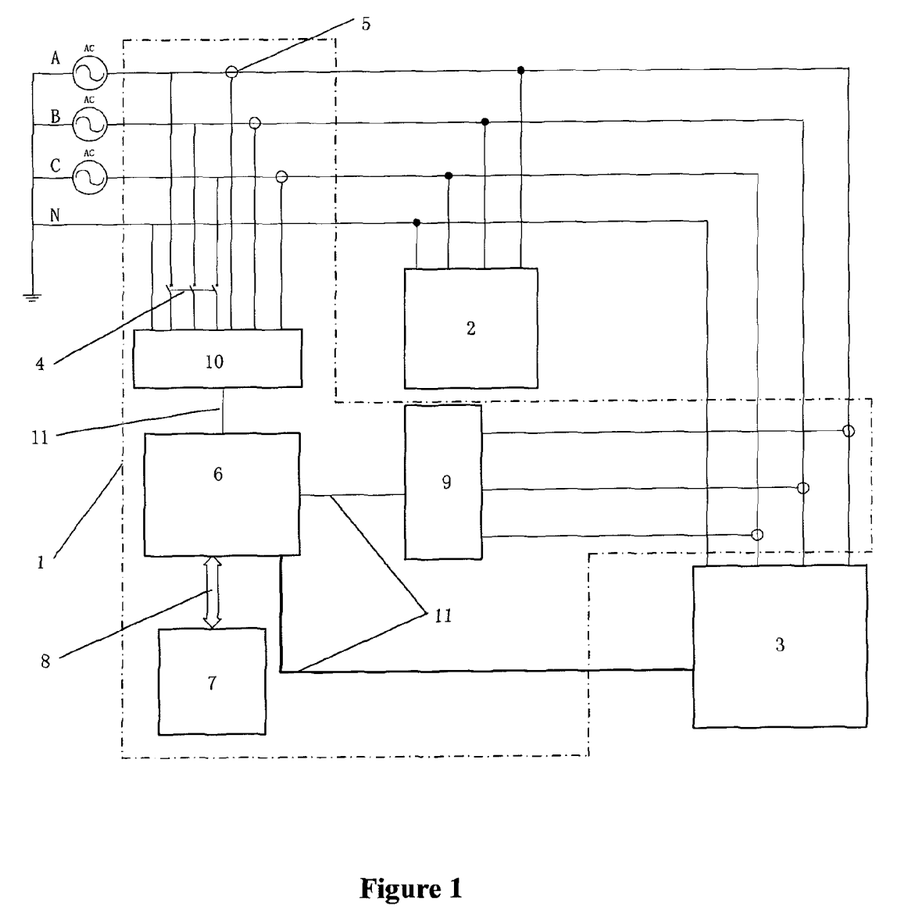
FIG. 1 is an overall structural diagram of the automatic three-phase unbalanced load compensation experimental device of the present invention.
Figure 2:
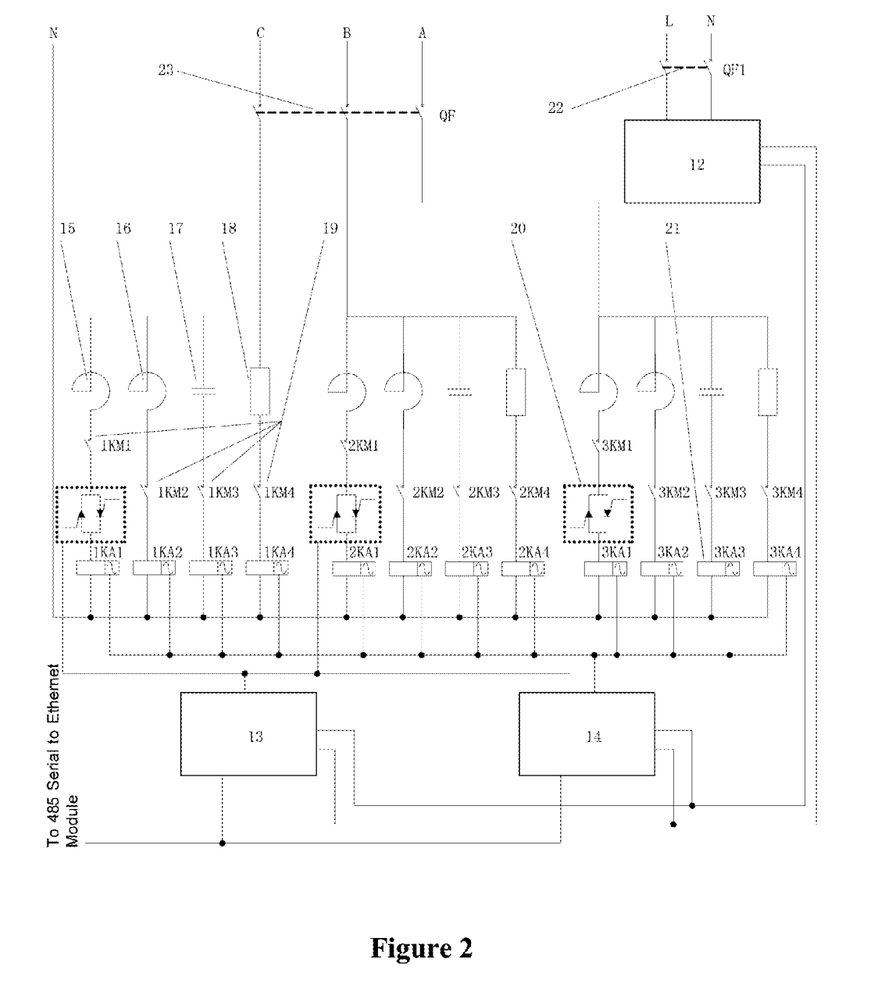
FIG. 2 is a diagram of the simulated load of the present invention.

As shown in FIG. 1 and FIG. 2, the automatic three-phase unbalanced load compensation experimental device of the present invention comprises an automatic compensation device 2, a load simulation part 3 and a detection, display and control part 1. The load simulation part 3 comprises A-phase load, B-phase load and C-phase load which have the same components, a switch power supply 12, an analog output module 13 and a relay output module 14; the A-phase load, the B-phase load and the C-phase load each comprise a single-phase nonlinear reactor with fixed impedance 15, a magnetic control reactor with adjustable single-phase impedance 16, a single-phase capacitor 17, a single-phase resistor 18, a single-phase AC contactor 19, an anti-parallel thyristor 20 and an intermediate relay 21; A-phase, B-phase and C-phase simulated loads are connected to the electrical network through a molded case circuit breaker; The detection, display and control part 1 comprises a current transformer 5, a molded case circuit breaker 4, a three-phase digital display ammeter 9, a three-phase electric power monitoring instrument 10, a protocol conversion module (485 serial to Ethernet module) 6, 485 buses 11, Ethernet cables 8 and an upper computer 7. The upper computer 7 controls the connection and disconnection of each simulated load of the load simulation part by operating the load simulation algorithm to assess the compensation effect of the automatic compensation device.

As shown in FIG. 1, the load simulation part 3 is connected with the electrical network; the automatic compensation device 2 is connected with the electrical network, connected with the load simulation part 3 in parallel and located in front of the load simulation part 3; the three-phase digital display ammeter 9 of the detection, display and control part 1 is connected with the current transformer of the electrical network on the load simulation side; the three-phase electric power monitoring instrument 10 of the detection, display and control part 1 is connected with the access point electrical network of the automatic compensation device 2.

Figure 3:
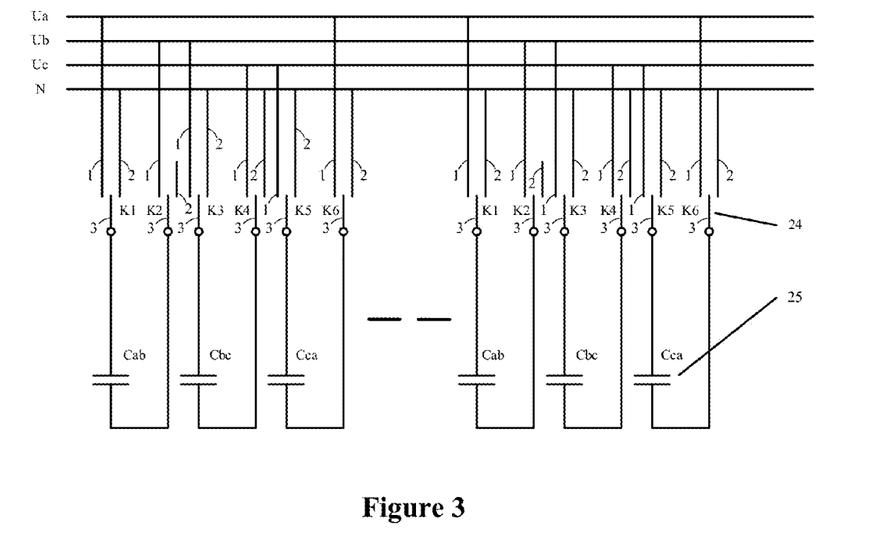
FIG. 3 is a structural connection diagram of the automatic compensation device of the present invention.

As shown in FIG. 3, the automatic compensation device 2 comprises a power capacitor 25 and an intelligent grouping load switch 24; both ends of the power capacitor 25 are respectively connected with the intelligent grouping load switch 24 which is connected with the electrical network, Ua is the A-phase voltage, Ub is the B-phase voltage. Uc is the C-phase voltage. N is the neutral wire. In addition, as shown in FIG. 3, the intelligent grouping load switch 24 includes six switches K1, K2, K3, K4, K5, K6. Each of the switches K1, K2, K3, K4, K5, K6 includes three terminals 1, 2, 3. Both ends of the power capacitor 25 (Cab) are connected to the terminals 3 of the switches K1, K2, respectively. Both ends of the power capacitor 25 (Cbc) are connected to the terminals 3 of the switches K3, K4. Moreover ends of the power capacitor (Cca) are connected to the terminals of the switches K5, K6. N represents a neutral wire.

As shown in FIG. 2, the load simulation part 3 comprises A-phase load, B-phase load and C-phase load which have the same components, a switch power supply 12, an analog output module 13 and a relay output module 14; the A-phase load, the B-phase load and the C-phase load each comprise a single-phase nonlinear reactor with fixed impedance 16, a magnetic control reactor with adjustable single-phase impedance 15, a single-phase capacitor 17, a single-phase resistor 18, a single-phase AC contactor 19, an anti-parallel thyristor 20 and an intermediate relay 21; A-phase, B-phase and C-phase simulated loads are in star connection in accordance with the three phase four wire system and each consist of four branches connected in parallel. For the C-phase load, one end of the magnetic control reactor with adjustable single-phase impedance 15 is connected with the single-phase AC contactor 19 (1KM1 in FIG. 2), the other end of the single-phase AC contactor 19 (1KM1 in FIG. 2) is connected with one end of the anti-parallel thyristor 20, and the other end of the anti-parallel thyristor 20 is connected with one end of the contact of the intermediate relay 21 (1KA1 in FIG. 2); one end of the single-phase nonlinear reactor with fixed impedance 16 (1KM2 in FIG. 2) is connected to one end of the single-phase AC contactor 19 (1KM2 in FIG. 2), and the other end of the single-phase AC contactor 19 (1KM2 in FIG. 2) is connected with one end of the contact of the intermediate relay 21 (1KA2 in FIG. 2); one end of the single-phase capacitor 17 is connected to one end of the single-phase AC contactor 19 (1KM3 in FIG. 2), and the other end of the single-phase AC contactor 19 (1KA3 in FIG. 2) is connected with one end of the contact of the intermediate relay 21 (1KA3 in FIG. 2); one end of the single-phase resistor 18 is connected to one end of the single-phase AC contactor 19 (1KM4 in FIG. 2), and the other end of the single-phase AC contactor 19 (1KM4 in FIG. 2) is connected with one end of the contact of the intermediate relay 21 (1KA4 in FIG. 2); the other end of the magnetic control reactor with adjustable single-phase impedance 15 are connected with the other end of the single-phase nonlinear reactor with fixed impedance 16, and the other end of the single-phase capacitor 17 is connected with the other end of the single-phase resistor 18; the other ends of the contacts of the intermediate relays 21 (1KA1, 1KA2, 1KA3 and 1KA4 in FIG. 2) are connected together and are connected with the neutral line; the A-phase load and the B-phase load have the same circuit connection with the C-phase load, and the A-phase load, the B-phase load and the C-phase load are in star connection and then are connected to the electrical network through the molded case circuit breaker 23.

Figure 4:
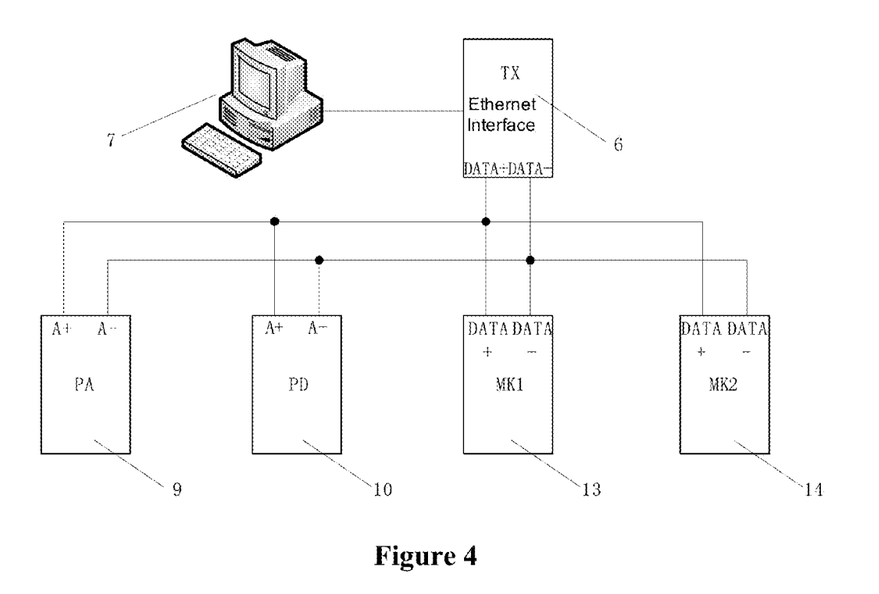
FIG. 4 is a connection diagram of the communication network cable of the present invention.
Figure 5:
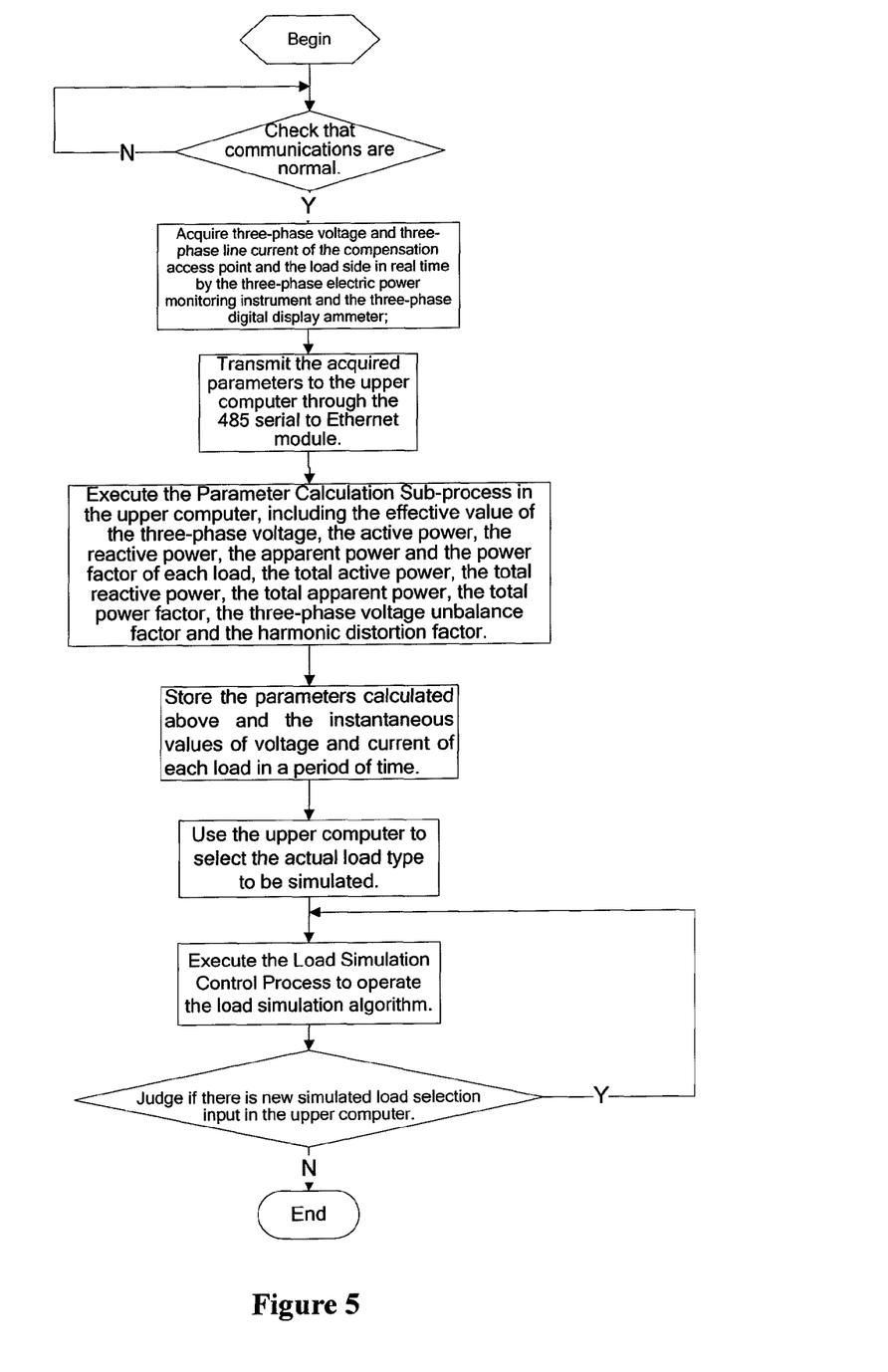
FIG. 5 is a flow chart of the computer control system of the present invention.
Figure 6:
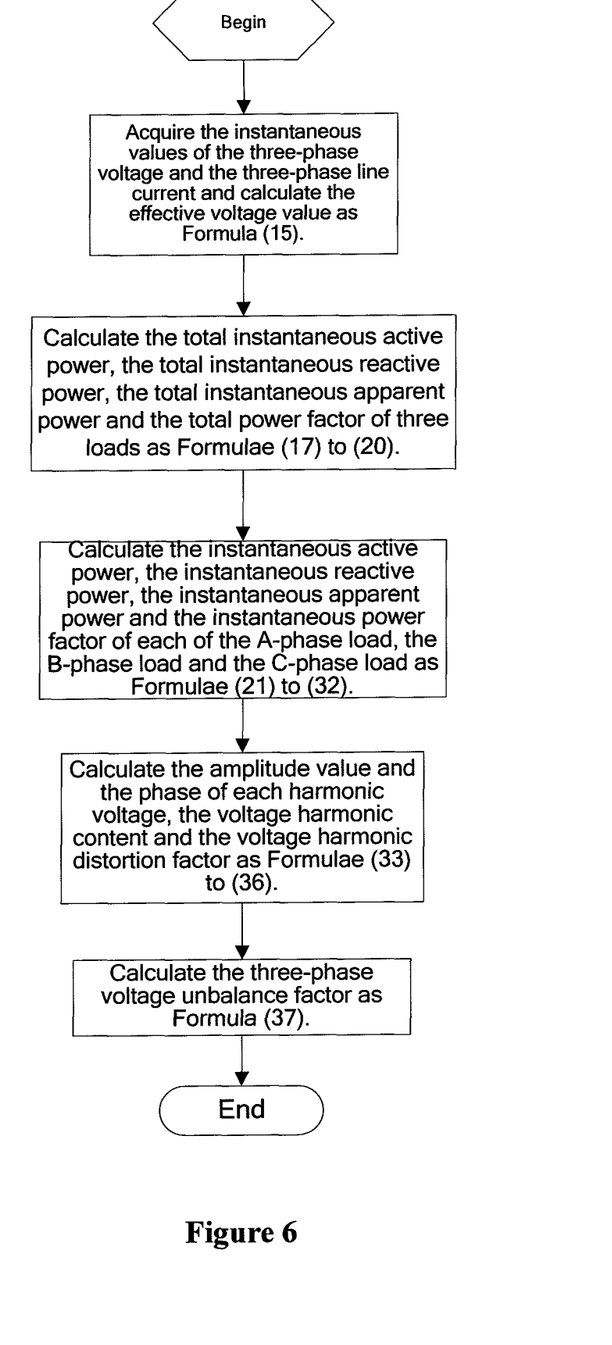
FIG. 6 is a flow chart of the parameter calculation sub-process of the present invention.
Figure 7:
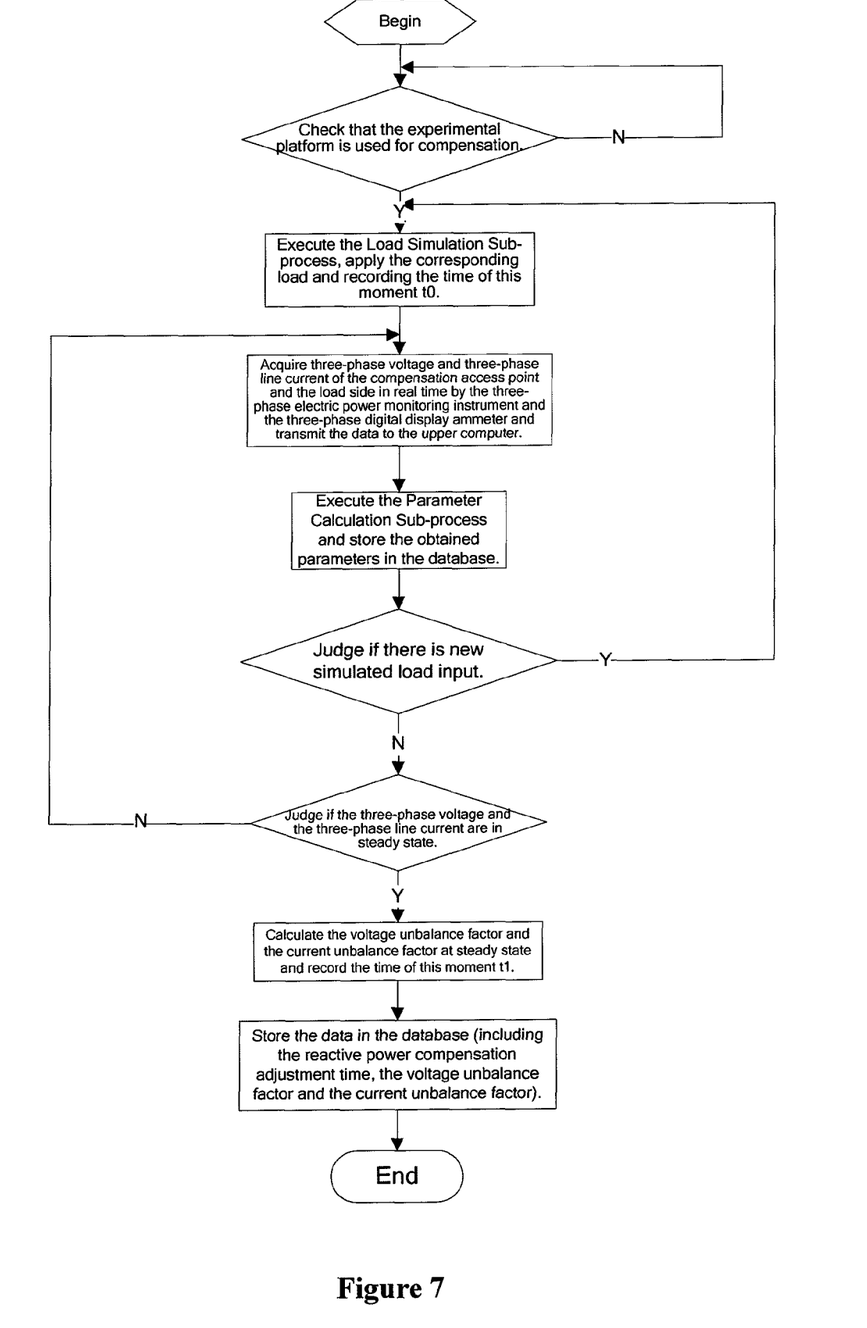
FIG. 7 is a flow chart of the load simulation control process of the present invention.
Figure 8:
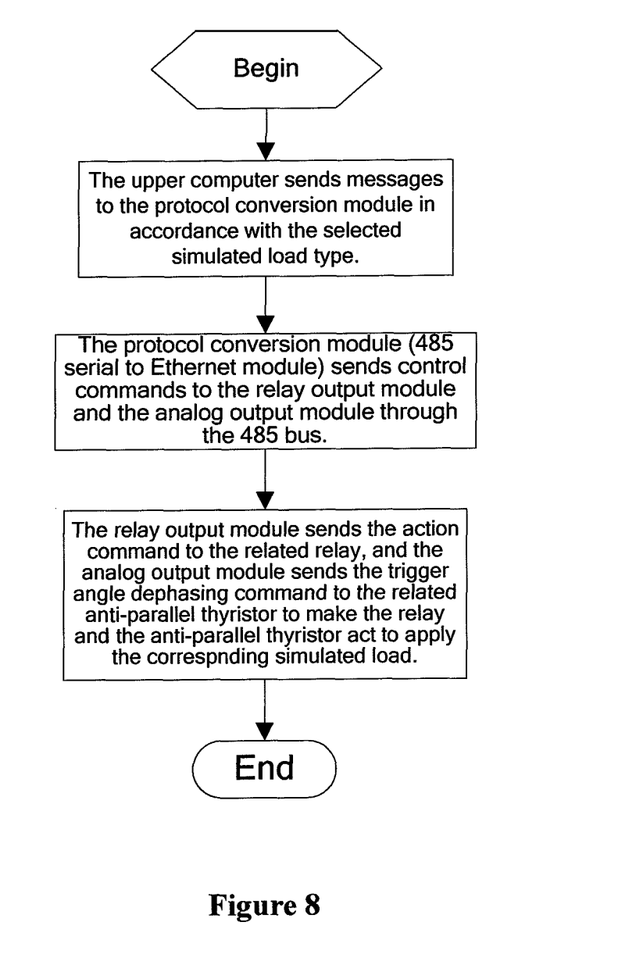
FIG. 8 is a flow chart of the load simulation sub-process of the present invention.

As shown in FIG. 1, FIG. 2 and FIG. 4, the detection, display and control part 1 comprises a current transformer 5, a molded case circuit breaker 4, a three-phase digital display ammeter 9, a three-phase electric power monitoring instrument 10, a protocol conversion module (485 serial to Ethernet module) 6, 485 buses 11, Ethernet cables 8 and an upper computer 7. The upper computer 7 is communicated through Ethernet and is connected to the Ethernet interface of the protocol conversion module (485 serial to Ethernet module) 6 by the Ethernet cable, the protocol conversion module (485 serial to Ethernet module) 6 is respectively connected to the three-phase electric power monitoring instrument 10, the three-phase digital display ammeter 9, and the 485 communication terminal blocks of the analog output module 13 and the relay output module 14 of the load simulation part 3 through 485 buses 11. The input end of the three-phase electric power monitoring instrument 10 is connected with the output ends of the molded case circuit breaker 4 and the current transformer 5, and the input ends of the molded case circuit breaker 4 and the current transformer 5 are connected to the electrical network; the input end of the three-phase digital display ammeter 9 is connected with the output end of the current transformer 5, and the input end of the current transformer 5 is connected with the electrical network; the output end of the analog output module 13 of the load simulation part 3 is connected to the control ends of the anti-parallel thyristors 20 of the A-phase load, the B-phase load and the C-phase load, and the relay output module 14 of the load simulation part 3 is connected to the coil of the intermediate relay 21 of each branch of the A-phase load, the B-phase load and the C-phase load; the input end of the switch power supply 12 of the load simulation part 3 is connected to the electrical network by a micro circuit breaker 22, and the output end is connected to the supply terminals of the analog output module 13 and the relay output module 14.

As shown in FIG. 5 to FIG. 8, the operating process of the circuit of the present invention is as follows: the system is powered on and starts to operate; firstly, the system is communicated by program and checked for normal communication; if the system is communicated normally, the program of the upper computer accesses the instantaneous values of the three-phase voltage and the three-phase line current acquired by the three-phase electric power monitoring instrument on the compensation access point and the three-phase digital display ammeter on the load side through Ethernet and 485 network; then the upper computer operates the parameter calculation sub-process, calculates the following parameters in accordance with the acquired data: the effective value of the three-phase voltage, the active power, the reactive power, the apparent power and the power factor of each load, the total active power, the total reactive power, the total apparent power, the total power factor, the three-phase voltage unbalance factor and the harmonic distortion factor, and stores the acquired data and the calculated parameters in the database for efficiency comparison after compensation. After the experiment operator uses the upper computer to select the actual load type to be simulated, the upper computer automatically operates the program of the load simulation control process; after the automatic compensation device is used for compensation, the computer executes the load simulation sub-process, controls the corresponding simulated load applied on each load by sending commands to the analog output module and the relay output module, and records the time of this moment t0; the program of the upper computer accesses the instantaneous values of the three-phase voltage and the three-phase line current acquired by the three-phase electric power monitoring instrument on the compensation access point and the three-phase digital display ammeter on the load side through Ethernet and 485 network, executes the parameter calculation sub-process, and stores the data in the database. Due to possible application of new simulated load, it is necessary to check that there is new simulated load selection input in the upper computer, if any, the load simulation sub-process is executed again and new simulated load is applied, otherwise continue; the three-phase voltage and the three-phase current are checked for steady state, i.e. whether compensation is steady, if not, continue acquiring data for parameter calculation and storage, and if yes, the voltage unbalance factor and the current unbalance factor at steady state are calculated, the time of this moment t1 is recorded, and these data are stored until there is new simulated load selection input, otherwise operation is over. The upper computer can dynamically display the three-phase voltage and the three-phase line current obtained by acquisition, and the active power, the reactive power, the apparent power and the power factor of each load, the total active power, the total reactive power, the total apparent power, the total power factor, the three-phase voltage unbalance factor and the harmonic distortion factor obtained by calculation.

The embodiment gives a group of acquired data dynamically displayed by the computer:

|  | Effective Value and Phase of Three-Phase Voltage | Active Power | Reactive Power | Apparent Power | Power Factor | Three-Phase Voltage Unbalance Factor | Voltage Harmonic Distortion Factor | Current Harmonic Distortion Factor |
|---|---|---|---|---|---|---|---|---|
| A Phase | 221.2 V (0°) | 1.1 KW | 0.26 kvar | 1.13 kva | 0.97 | 1.25% | 0.5% | 0.4% |
| B Phase | 220.8 V (−120°) | 1.2 KW | 0.16 kvar | 1.21 kva | 0.99 |  | 0.4% | 0.3% |
| C Phase | 222.3 V (−240.5°) | 1.1 KW | 0.21 kvar | 1.12 kva | 0.98 |  | 0.4% | 0.4% |
| Three Phases |  | 3.4 KW | 0.63 kvar | 3.46 kva | 0.98 |  |  |  |

The present invention gives the following typical simulated load types:
Load Type 1: Three-Phase Unbalanced Impact Load
  Typical examples: electric welding equipment, rolling mill, riser, winch, crane, electric arc furnace, etc.
Step 1: Begin;
Step 2: Engage relays 1KA1, 1KA4, 2KA1 and 2KA4 and contactors 1KM1, 1KM4, 2KM1 and 2KM4, and disengage others;
Step 3: Delay t1, and disengage all relays and contactors after steady state is reached;
Step 4: End.
Load Type 2: Three-Phase Unbalanced Nonlinear Load
  Typical examples: large-scale convertor equipment, frequency control device, household appliance, rolling mill, etc.
Step 1: Begin;
Step 2: Engage relays 1KA2, 1KA4, 3KA2 and 3KA4 and contactors 1KM2, 1KM4, 3KM2 and 3KM4, and disengage others;
Step 3: Delay t2, and disengage all relays and contactors after steady state is reached;
Step 4: End.
Load Type 3: Three-Phase Unbalanced Load Caused by Single-Phase Random Load
  Typical examples: electric locomotive on electrified railway, and office equipment, such as computer printer, etc.
Step 1: Begin;
Step 2: Engage relays 1KA2 and 1KA4 and contactors 1KM2 and 1KM4, and disengage others;
Step 3: Delay t3, and disengage all relays and contactors after steady state is reached;
Step 4: End.

In the embodiment of the present invention, the types are as follows: current transformer—BH-0.66 75/5, molded case circuit breaker—DNM1-100 M/3300-80A, micro circuit breaker—DNB-63 2P C6A, single-phase AC contactor—DNLC1-D25 AC220V, intermediate relay—MY2NJ DC24V, switch power supply—AC220V/DV24V5A, analog output module—I-7024D DV24V, relay output module—I-7067D DV24V, three-phase digital display ammeter—PA1941-9K4, three-phase electric power monitoring instrument—PA2000-3, protocol conversion module—SK6000B, anti-parallel thyristor—CRS20KW, single-phase resistor—RXLG-5KW, single-phase capacitor—BSNG-8/0.525, magnetic control reactor with adjustable single-phase impedance—KTSG-20 kvar/0.4, single-phase nonlinear reactor with fixed impedance—BKSG-10 kvar/0.38, and automatic compensation device—LHRC-TB.

What is claimed is:
1. An automatic three-phase unbalanced load compensation experimental device, comprising:
  an automatic compensation device, a load simulation part, and a detection, display and control part,
  wherein the automatic compensation device comprises a power capacitor and an intelligent grouping load switch, and both ends of the power capacitor are respectively connected with the intelligent grouping load switch which is connected with the electrical network,
  wherein the load simulation part comprises A-phase load, B-phase load and C-phase load which have the same components, a switch power supply, an analog output module and a relay output module, wherein the input end of the switch power supply is connected to the electrical network by a micro circuit breaker, and the output end of the switch power supply is connected to the supply terminals of the analog output module and the relay output module, wherein the A-phase load, the B-phase load and the C-phase load each comprise a plurality of single-phase nonlinear reactors with fixed impedances, a plurality of magnetic control reactors with adjustable single-phase impedances, a plurality of single-phase capacitors, a plurality of single-phase resistors, a plurality of single-phase AC contactors, a plurality of anti-parallel thyristors and a plurality of intermediate relays, wherein A-phase, B-phase and C-phase simulated loads of the above three phases are connected to an electrical network through a first molded case circuit breaker, wherein the input ends of the analog output module and the relay output module are connected to RS-485 buses through an Ethernet module; the output ends of the analog output module are connected to the A-phase, B-phase and C-phase simulated loads of the plurality of anti-parallel thyristors, respectively; and the output ends of the relay output module are connected to the A-phase, B-phase and C-phase simulated loads of the plurality of intermediate relays, wherein the detection, display and control part comprises a plurality of current transformers, a second molded case circuit breaker, a three-phase digital display ammeter, a three-phase electric power monitoring instrument, a protocol conversion module, RS-485 buses, Ethernet cables and an upper computer, wherein the Ethernet cables are connected to the upper computer through the protocol conversion module, wherein the load simulation part is connected with the electrical network; the automatic compensation device is connected with the electrical network, connected with the load simulation part in parallel and located in front of the load simulation part; the three-phase digital display ammeter of the detection, display and control part is connected with the plurality of current transformers of the electrical network on the load simulation side; the three-phase electric power monitoring instrument of the detection, display and control part is connected with an access point electrical network of the automatic compensation device, and wherein for the C-phase load, one end of the magnetic control reactor with adjustable single-phase impedance is connected with the single-phase AC contactor, the other end of the single-phase AC contactor is connected with one end of the anti-parallel thyristor, and the other end of the anti-parallel thyristor is connected with one end of the contact of the intermediate relay; one end of the single-phase nonlinear reactor with fixed impedance is connected to one end of the single-phase AC contactor, and the other end of the single-phase AC contactor is connected with one end of the contact of the intermediate relay.

2. The automatic three-phase unbalanced load compensation experimental device as claimed in claim 1, wherein the upper computer of the detection, display and control part is communicated through Ethernet and is connected to the Ethernet interface of the protocol conversion module by the Ethernet cable, and the protocol conversion module is respectively connected to the three-phase electric power monitoring instrument, the three-phase digital display ammeter, and the RS-485 communication terminal blocks of the analog output module and the relay output module of the load simulation part through RS-485 buses, wherein the input end of the three-phase electric power monitoring instrument is connected with the output ends of the second molded case circuit breaker and the plurality of current transformers, and the input ends of the second molded case circuit breaker and the plurality of current transformers are connected to the electrical network, wherein the input end of the three-phase digital display ammeter is connected with the output end of the plurality of current transformers, and the input end of the plurality of current transformers is connected with the electrical network; the output end of the analog output module of the load simulation part is connected to the control ends of the anti-parallel thyristors of the A-phase load, the B-phase load and the C-phase load, and the relay output module of the load simulation part is connected to the coil of the intermediate relay of each branch of the A-phase load, the B-phase load and the C-phase load, and wherein the input end of the switch power supply of the load simulation part is connected to the electrical network by the micro circuit breaker, and the output end thereof is connected to the supply terminals of the analog output module and the relay output module.

3. A control method of an automatic three-phase unbalanced load compensation experimental device, comprising the following steps:

Step 1: Beginning;

Step 2: Checking that communications are normal; if yes, go to Step 3; otherwise, continue waiting;

Step 3: Acquiring three-phase voltage and three-phase line current of the compensation access point and the load side in real time by the three-phase electric power monitoring instrument and the three-phase digital display ammeter;

Step 4: Transmitting the parameters of the three-phase voltage and the three-phase line current to the upper computer through a RS-485 serial to Ethernet module;

Step 5: Executing the Parameter Calculation Sub-process in the upper computer, wherein parameter calculation refers to using the instantaneous values of the measured three-phase voltage and three-phase line current to calculate the effective value of the three-phase voltage, the active power, the reactive power, the apparent power and the power factor of each load, the total active power, the total reactive power, the total apparent power, the total power factor, the three-phase voltage unbalance factor and the harmonic distortion factor;

wherein the parameter calculation sub-process in Step 5 comprises the following steps:

Step 1: Beginning;

Step 2: Acquiring the instantaneous values of the three-phase voltage and the three-phase line current to calculate the effective value of the voltage;

Step 3: Calculating the total instantaneous active power p, the total instantaneous reactive power q, the total instantaneous apparent power s and the total instantaneous power factor $\cos \theta$ of A-phase load, B-phase load and C-phase load $$p = u_a i_a + u_b i_b + u_c i_c \quad (1)$$

$$q = \frac{1}{\sqrt{3}}[(u_b - u_c)i_a + (u_c - u_a)i_b + (u_a - u_b)i_c] \quad (2)$$

$$s = \sqrt{p^2 + q^2} \quad (3)$$

$$\cos\theta = \frac{p}{s} \quad (4)$$

wherein $u_a$, $u_b$, $u_c$ represent the A-phase instantaneous voltage, the B-phase instantaneous voltage and the C-phase instantaneous voltage, respectively, $i_a$, $i_b$, $i_c$ represent the A-phase line current, the B-phase line current and the C-phase line current, respectively, Step 4: Calculating the instantaneous active power $p_a$, $p_b$ and $p_c$, the instantaneous reactive power $q_a$, $q_b$ and $q_c$, the instantaneous apparent power $s_a$, $s_b$, and $s_c$ and the instantaneous power factors $\cos \theta_a$, $\cos \theta_b$, and $\cos \theta_c$ of each of the A-phase load, the B-phase load and the C-phase load A-phase load:

$$p_a = u_a i_{ap} = 3u_a^2 \frac{p}{A} \quad (5)$$

$$q_a = u_a i_{aq} = u_a(u_b - u_c)\frac{q}{A} \quad (6)$$

-continued $$s_a = \sqrt{p_a^2 + q_a^2} \quad (7)$$

$$\cos\theta_a = \frac{p_a}{s_a} \quad (8)$$

B-phase load:

$$p_b = u_b i_{bp} = 3u_b^2 \frac{p}{A} \quad (9)$$

$$q_b = u_b i_{bq} = u_b(u_c - u_a)\frac{q}{A} \quad (10)$$

$$s_b = \sqrt{p_b^2 + q_b^2} \quad (11)$$

$$\cos\theta_b = \frac{p_b}{s_b} \quad (12)$$

C-phase load:

$$p_c = u_c i_{cp} = 3u_c^2 \frac{p}{A} \quad (13)$$

$$q_c = u_c i_{cq} = u_c(u_a - u_b)\frac{q}{A} \quad (14)$$

$$s_c = \sqrt{p_c^2 + q_c^2} \quad (15)$$

$$\cos\theta_c = \frac{p_c}{s_c} \quad (16)$$

wherein, $A=(u_a-u_b)^2+(u_b-u_c)^2+(u_c-u_a)^2$, wherein $p_a$, $p_b$, $p_c$ represent the A-phase instantaneous active power, the B-phase instantaneous active power and the C-phase instantaneous active power, respectively, $q_a$, $q_b$, $q_c$ represent the A-phase instantaneous reactive power, the B-phase instantaneous reactive power and the C-phase instantaneous reactive power, respectively, sa, sb, sc represent the A-phase instantaneous apparent power, the B-phase instantaneous apparent power and the C-phase instantaneous apparent power, respectively, $\cos\theta_a$, $\cos\theta_b$ and $\cos\theta_c$ represent the A-phase instantaneous power factor, the B-phase instantaneous power factor and the C-phase instantaneous power factor, respectively;

Step 5: Calculating the amplitude value $U_m$ and the phase $\phi_m$ of each harmonic voltage, the voltage harmonic content $HRU_m$ and the voltage harmonic distortion factor $THD_U$;

$$U_m = \sqrt{a_m^2 + b_m^2} \quad (17)$$

$$\varphi_m = \arctan\frac{b_m}{a_m} \quad (18)$$

$$HRU_m = \frac{U_m}{U_1} \times 100\% \quad (19)$$

$$THD_U = \frac{\sqrt{\sum_{m=2}^{M} U_m^2}}{U_1} \times 100\% \quad (20)$$

wherein $U_m$ represents the m-th harmonic voltage amplitude value, $U_1$ represents the first harmonic voltage amplitude value, $\phi_m$ represents the m-th harmonic voltage phase, $HRU_m$ represents the m-th harmonic voltage content, and $THD_U$ represents the m-th harmonic voltage harmonic distortion factor, Step 6: Calculating the three-phase voltage unbalance factor $\epsilon$;

$$\varepsilon = \sqrt{\frac{U_{A1}^2 + U_{C1}^2 - 2U_{A1}U_{C1}\cos(|\varphi_{A1} - \varphi_{C1}| - 120°)}{U_{A1}^2 + U_{C1}^2 - 2U_{A1}U_{C1}\cos(240° - |\varphi_{A1} - \varphi_{C1}|)}} \times 100\% \quad (21)$$

Step 7: Ending the parameter calculation sub-process;
Step 8: Storing the data into the database, wherein, the data include parameters calculated in Step 5 and the instantaneous values of voltage and current of each load in a period of time for harmonic analysis and efficiency assessment;
Step 9: Using the upper computer to select the actual load type to be simulated;
Step 10: Executing the Load Simulation Control Process in accordance with the result in Step 7 to operate the load simulation algorithm;
Step 11: Judging if there is new simulated load selection input in the upper computer; if any, skip to Step 8; otherwise, go to Step 10;
Step 12: Ending.

4. The control method of the automatic three-phase unbalanced load compensation experimental device as claimed in claim 3, wherein the load simulation control process in Step 9 comprises the following steps:
Step 1: Beginning;
Step 2: Checking that the experimental platform is used for compensation; if yes, go to Step 3; otherwise, continue waiting;
Step 3: Executing the Load Simulation Sub-process, applying the corresponding load and recording the time of this moment t0;
Step 4: Acquiring three-phase voltage and three-phase line current of the compensation access point and the load side in real time by the three-phase electric power monitoring instrument and the three-phase digital display ammeter and transmitting them to the upper computer;
Step 5: Executing the Parameter Calculation Sub-process and store the obtained parameters in the database;
Step 6: Judging if there is new simulated load selection input in the upper computer; if any, skip to Step 3; otherwise, go to Step 7;
Step 7: Judging if the three-phase voltage and the three-phase line current are in steady state; if yes, go to Step 8; otherwise, skip to Step 4;
Step 8: Calculating the voltage unbalance factor and the current unbalance factor at steady state and recording the time of this moment t1;
Step 9: Storing the data in the database, including the reactive power compensation adjustment time and the voltage unbalance factor;
Step 10: Ending.

5. The control method of the automatic three-phase unbalanced load compensation experimental device as claimed in claim 4, wherein the load simulation sub-process in Step 3 comprises the following steps:
Step 1: Begin;
Step 2: The upper computer sends messages to the protocol conversion module in accordance with the selected simulated load type;

Step 3: The protocol conversion module sends control commands to the analog output module and the relay output module through the RS-485 bus;

Step 4: The relay output module sends the action command to the related relay, and the analog output module sends the trigger angle dephasing command to the related anti-parallel thyristor to make the relay and the anti-parallel thyristor act to apply the corresponding simulated load;

Step 5: End.

* * * * *